US006058394A

United States Patent [19]
Bakow et al.

[11] Patent Number: 6,058,394
[45] Date of Patent: *May 2, 2000

[54] MANAGER SERVER SELECTS AN AGENT SERVER TO EXECUTE QUERY BASED ON AVAILABILITY OF THE SERVER CONNECTIONS TO DATA SOURCE AND TARGET

[75] Inventors: Linnette M. Bakow; Jean-Jacques P. Daudenarde, both of San Jose; Giuseppe Facchetti, Saratoga, all of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/921,196

[22] Filed: Aug. 29, 1997

[51] Int. Cl.[7] .................................... G06F 17/30
[52] U.S. Cl. ..................... 707/10; 707/102; 707/103; 709/203; 709/217; 709/219; 709/223
[58] Field of Search ................. 707/1, 2, 3, 4, 707/5, 10, 100–104, 200–204; 395/672, 682, 200.57, 200.33, 200.54, 200.53; 709/203, 213, 217, 220, 223–226, 229–232, 248–252, 219

[56] References Cited

U.S. PATENT DOCUMENTS

| | | | |
|---|---|---|---|
| 5,379,419 | 1/1995 | Heffernan et al. | 707/4 |
| 5,526,492 | 6/1996 | Ishida | 395/200.58 |
| 5,560,005 | 9/1996 | Hoover et al. | 707/10 |
| 5,561,769 | 10/1996 | Kumar et al. | 395/200.32 |
| 5,583,997 | 12/1996 | Hart | 395/200.48 |
| 5,590,321 | 12/1996 | Lin et al. | 707/10 |
| 5,592,626 | 1/1997 | Papadimitriou et al. | 395/672 |
| 5,596,744 | 1/1997 | Dao et al. | 707/10 |
| 5,623,605 | 4/1997 | Keshav et al. | 709/236 |
| 5,675,785 | 10/1997 | Hall et al. | 707/102 |
| 5,754,841 | 5/1998 | Carino, Jr. | 707/3 |
| 5,761,663 | 6/1998 | Lagarde et al. | 707/10 |
| 5,765,147 | 6/1998 | Mattos et al. | 707/4 |
| 5,781,911 | 7/1998 | Young et al. | 707/102 |

OTHER PUBLICATIONS

IBM Technical Disclosure Bulletin, vol. 38, No. 01, Jan. 1995, pp. 607–608.
IBM Internet article, http://www.accu–info.com/ibm18–01.htm, "Great New Ads", NewsBooth #18, Oct. 3, 1996 (entire document).
Brower, D. et al., Internet article, http://globecom.net/ietf/rfc1697.shtml, "RFC1697: Relational Database Management System (RDBMS) Management Information Base (MIB) using SMIv2", pp. 1–36.
National Geophysical Data Center/WDC–A For Solid Earth Geophysics, Internet article, http://julius.ngdc.noaa.gov/seg/prosol.html, "NGDC Hierarchical Data & Metadata Server", Jan. 1997(entire document).
Internet article, http://skydive.ncsa.ui . . . present/wm16/fd15.html, "URL/Metadata Database—Georgia Tech" (entire document).
Internet article, http://skydive.ncsa.ui . . . present/wm16/fd16.html, "Bidirectional Links for the Web" (entire document).
Berkeley Multimedia Research Center, Internet article, http://www.bmrc.berkel . . . ers/VodsArch94.html#24, "A Distributed Hierarchial Storage Manager for a Video–on–Demand System", Storage and Retrieval for Image and Video Databases II, IS&T/SPIE Symp. on Elec. Imaging Sci. & Tech., San Jose, CA, Feb. 1994, pp. 1–16.

*Primary Examiner*—Jack M. Choules
*Assistant Examiner*—Srirama Channavajjala
*Attorney, Agent, or Firm*—Pretty, Schroeder & Poplawski, P.C.

[57] ABSTRACT

A method, apparatus, and article of manufacture for a scalable data warehouse architecture. A query is executed in a computer to retrieve data from a database stored on a data storage device. Under control of a manager server, one of a plurality of agent servers is selected to execute the query based upon availability of each agent server and based upon connections between each agent server and a data source and a data target required for execution of the query.

18 Claims, 2 Drawing Sheets

MANAGER SERVER SELECTS AN AGENT SERVER TO EXECUTE QUERY BASED ON AVAILABILITY OF THE SERVER CONNECTIONS TO DATA SOURCE AND TARGET

CROSS-REFERENCE TO RELATED APPLICATION

This application is related to the following co-pending and commonly-assigned patent application:

Application Ser. No. 08/921,198, now U.S. Pat. No. 5,995,973, entitled "OBJECT RELATIONSHIPS," filed on same date herewith, by Jean-Jacques P. Daudenarde, which is incorporated by reference herein.

BACKGROUND OF THE INVENTION

1. Field of the Invention

This invention relates in general to computer-implemented data warehouse systems, and in particular, to a computer-implemented scalable data warehouse architecture.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO).

In RDBMS software, all data is externally structured into tables. The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the DBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

Today, a DBMS can instead be an object-oriented database management system (OODBMS). An object-oriented database is organized into objects having members that can be pointers to other objects. One of the key features of an OODBMS is the ability to navigate between objects using these pointers. Additionally, an object can have relationships to other objects. The objects contain references, and collections of references, to other objects in the database, thus leading to databases with complex nested structures.

In conventional relational or object-oriented database systems, a client computer is connected to a server computer. The server computer is connected to a data storage device holding a database. When a user desires to obtain data from the database, the user inputs a request for data at the client computer. The client computer transmits the request to the server computer, which retrieves the requested data from the database. The server computer transmits the retrieved data to the client computer. Next, the client computer provides the data to the user. However, as computers are connected in more complicated networks, this is an inefficient manner of retrieving data. There is a need in the art for an improved method of retrieving data when computers are connected in complicated networks.

SUMMARY OF THE INVENTION

To overcome the limitations in the prior art described above, and to overcome other limitations that will become apparent upon reading and understanding the present specification, the present invention discloses a method, apparatus, and article of manufacture for a scalable data warehouse architecture.

According to the present invention, a query is executed in a computer to retrieve data from a database stored on a data storage device. Under control of a manager server, one of a plurality of agent servers is selected to execute the query based upon the availability of each agent server and connections between each agent server and a data source and a data target required for execution of the query.

An object of the present invention is to provide a scalable data warehouse architecture with a two-tier server architecture. Another object of the present invention is to provide a manager server for managing agent servers, which transfer data between a data target and a data source.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
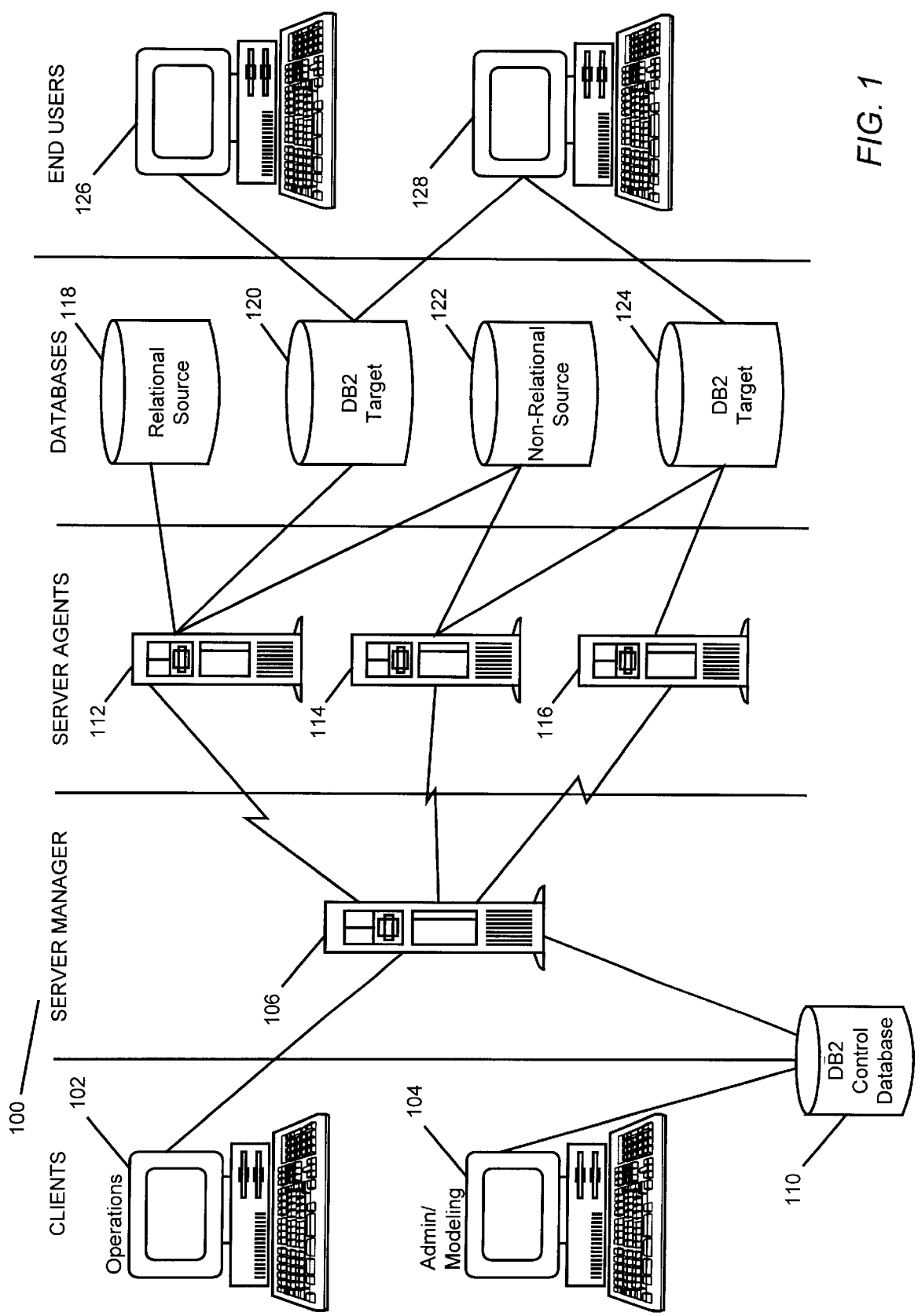
FIG. 1 is a block diagram illustrating an exemplary hardware environment used to implement the preferred embodiment of the present invention.

FIG. 1 is a block diagram illustrating an exemplary hardware environment used to implement the preferred embodiment of the present invention. In the exemplary hardware environment, a scalable data warehouse architecture 100 is illustrated. The scalable data warehouse architecture 100 has a two-tier server architecture.

Data warehouse client computers 102 and 104 having, inter alia, monitors and data storage devices, are connected to a DB2 control database 110. The client computers 102 and 104 communicate with the first tier of server computers 106 to request processing of a query. Execution of the query transfers data from a source database 118 and 122 to a target database 120 and 124. End user computers 126 and 128 are connected to the target databases 120 and 124, which enables users to perform data analysis at the end user computers 126 and 128.

The first tier comprises a server computer 106 connected to a data storage device 110, which is a DB2 control database 110. This server computer 106 is a manager server for interfacing with client computers 102 and 104 and exercising control over the second tier of server computers 112, 114, and 116. The manager server computer 106 receives a query from a client computer 102 or 104. The manager server computer 106 schedules the processing of the query and stores the query in the DB2 control database 110 for later forwarding to an agent server computer 112, 114, or 116 for execution of the query.

The second tier of server computers 112, 114, and 116 are agent server computers for transferring data between data sources 118 and 122 and data targets 120 and 124. The manager server computer 106 preferably communicates with the agent server computers 112, 114, and 116 via Transmission Control Protocol/Internet Protocol (TCP/IP). The agent server computers 112, 114, and 116 preferably communicate with databases 118, 120 122, and 124 via Open Database Connectivity (ODBC). Once an agent server computer 112, 114, or 116 has executed a query, the agent server computer 112, 114, or 116 reports status information to the manager server computer 106. The status information may include return codes, messages, and statistical information. The manager server computer 106 stores the status information in the DB2 control database 110. The client computers 102 and 104 can access the status information in the DB2 control database 110.

In the exemplary hardware environment, the client computers 102 and 104 and the server computers 106, 112, 114, and 116 may each include, inter alia, a processor, memory, keyboard, or display, and may be connected locally or remotely to fixed and/or removable data storage devices and/or data communications devices. Each of the computers 102, 104, 106, 112, 114, and 116 could also be connected to other computer systems via the data communications devices. Those skilled in the art will recognize that any combination of the above components, or any number of different components, peripherals, and other devices, may be used with the computers 102, 104, 106, 112, 114, and 116. Those skilled in the art will also recognize that the present invention may be implemented on a single computer, rather than multiple computers networked together.

The present invention is typically implemented using one or more computer programs, each of which executes under the control of an operating system, such MVS™, AIX™, OS/2™, WINDOWS NT™, WINDOWS™, UNIX™, etc., and causes the computers 102, 104. 106, 112. 114, and 116 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system(s) are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 102, 104, 106, 112, 114, and 116, cause the computers 102, 104, 106, 112, 114, and 116 to perform the steps necessary to implement and/or use the present invention. Under control of the operating system, the computer programs may be loaded from the memory, data storage devices, and/or data communications devices into the memories of the computers 102, 104, 106, 112, 114, and 116 for use during actual operations. Those skilled in the art will recognize many modifications may be made to this configuration without departing from the scope of the present invention.

Scalable Data Warehouse Architecture

The present invention is a scalable data warehouse architecture 100 that utilizes two layers of server computers. The first layer is a manager server computer 106 for interfacing with data warehouse client computers 102 and 104. The manager server computer 106 also exercises control over the second layer. The second layer is scalable and is comprised of agent server computers 112, 114, and 116 for transferring data between data sources 118 and 122 and data targets 120 and 124.

The present invention is further distinguished by the method in which data is accessed through the agent server computers 112, 114, and 116. In particular, not every agent server computer 112, 114, and 116 is connected to every database. Instead, agent server computers 112, 114, and 116 are connected to pairs of data sources 118 and 122 and data targets 120 and 124. The manager server computer 106 schedules queries for execution by an agent server computer 112, 114, or 116 based upon availability of the agent server computers 112, 114, and 116 and based upon the data sources 118 and 122 and data targets 120 and 124 connected to particular agent server computers 112, 114, and 116. Data transfers are therefore limited to those between a data source 118 and 122 and a data target 120 and 124 connected to a common agent server computer 112, 114, or 116.

One of the advantages of the present invention is that it integrates the processes used at the different agent server computers 112, 114, and 116. The agent server computers 112, 114, and 116 are independent computers in that each can use its own computer programs, operating system, hardware platforms, and data sources and data targets. Yet, the DB2 control database 110 allows for central control and documentation of both the structure of the warehouse and the currency of the data.

Figure 2:
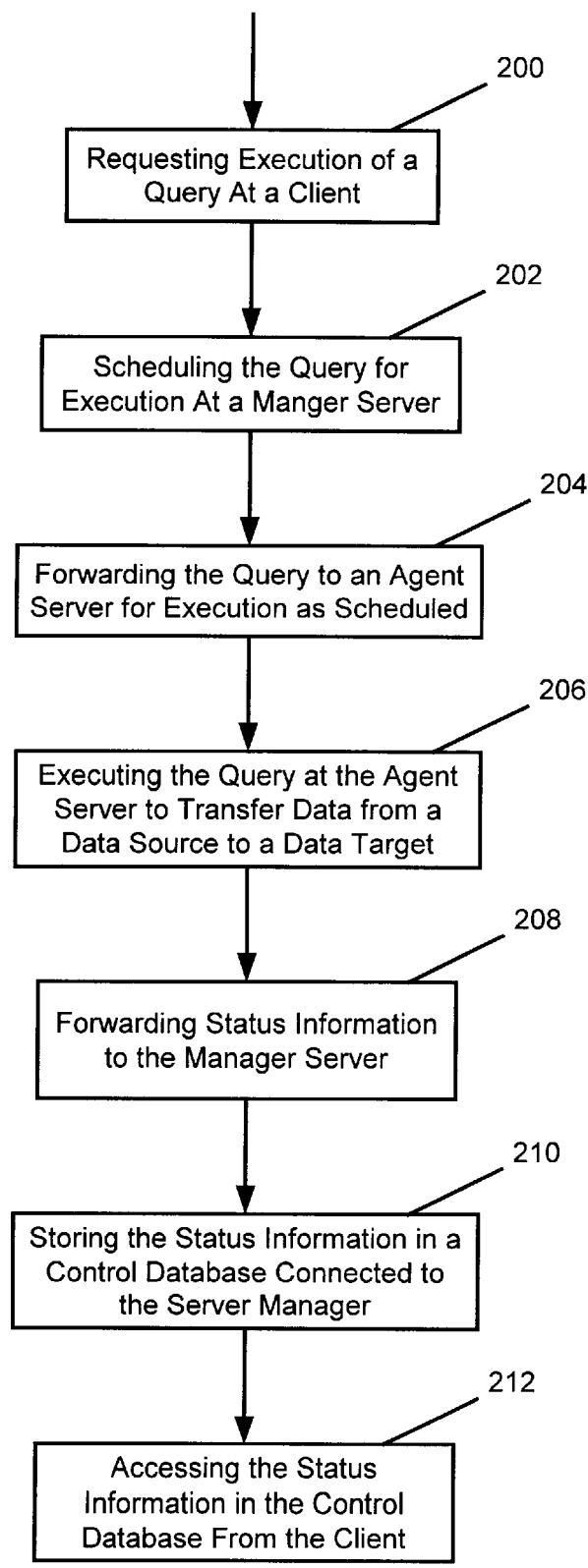
FIG. 2 is a flow diagram illustrating the steps performed by the present invention to execute a query in a scalable data warehouse architecture.

FIG. 2 is a flow diagram illustrating the steps performed by the present invention to execute a query in a scalable data warehouse architecture 100. In Block 200, the client computer 102 or 104 requests execution of a query. The query is forwarded from the client computer 102 or 104 to the manager server computer 106. In Block 202, the manager server computer 106 schedules the query for execution. The manager server computer 106 schedules the query based on the availability of agent server computers 112, 114, and 116. The manager server computer 106 also determines scheduling based on which data source 118 and 122 and data target 120 and 124 are required for the query and which agent server computer 112, 114, or 116 is connected to the required pair of data sources 118 and 122 and data targets 120 and 124.

The present invention is especially useful in that it is scalable. If a user of the scalable data warehouse architecture 100 determines that the manager server computer 106 is receiving so many queries that the server computer 106 is unable to schedule the agent computers 112, 114, and 116 for processing within a time acceptable to the user, the scalable data warehouse architecture 100 can be easily scaled to process a greater number of queries by adding additional agent server computers to the second tier of agent server computers 112, 114, and 116.

In Block 204, the manager server computer 106 forwards the query to an agent server computer 112, 114, or 116 for execution as scheduled. In Block 206, the present invention executes the query at an agent server computer 112, 114, or 116 to transfer data from a data source 118 and 122 to a data target 120 and 124. In Block 208, the agent server computer 112, 114, or 116 forwards status information to the manager server computer 106. In Block 210, the manager server computer 106 stores the status information in a DB2 control database 110 connected to the manager server computer 106. In Block 212, the client computer 102 or 104 accesses the status information in the DB2 control database 110.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a scalable data warehouse architecture 100. The present invention provides a scalable data warehouse architecture 100 with a two-tier server architecture. Additionally, the present invention provides a manager server computer for managing agent server computers, which transfer data between a data target and a data source.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query in a computer to retrieve data from a database stored on a data storage device, comprising the steps of:

under control of a manager server:

selecting one of a plurality of agent servers to execute the query based upon availability of each agent server and based upon connections between each agent server and a data source and a data target required for execution of the query;

limiting each data transfer to data transfers between the data source and the data target, when both the data source and the data target are connected to the selected agent server; and under control of the selected agent server, transferring data from the data source to the data target without using one of the other agent servers, wherein the data source and the data target are both connected to the selected agent server.

2. The method of claim 1 above, further comprising, under control of an agent server, the steps of:

receiving the query from the manager server;

executing the query to obtain status information; and transmitting the status information to the manager server.

3. The method of claim 2 above, further comprising, under control of the manager server, the steps of:

receiving the status information; and storing the status information at a central storage device.

4. The method of claim 3 above, wherein the manager server is connected to a client that requests the query, and further comprising the step of, under control of the client, accessing the stored status information.

5. The method of claim 1 above, wherein a data analysis computer is connected to the data target, further comprising the step of performing data analysis on the data target from the data analysis computer.

6. The method of claim 1 above, wherein after the step of selecting, the manager server stores the query for later forwarding to an agent server.

7. An apparatus for executing a query to retrieve data from a database, comprising:

(a) a computer having a memory and a data storage device coupled thereto, wherein the data storage device stores the database;

(b) one or more computer programs, performed by the computer, for, under control of a manager server: selecting one of a plurality of agent servers to execute the query based upon availability of each agent server and based upon connections between each agent server and a data source and a data target required for execution of the query, limiting each data transfer to data transfers between the data source and the data target, when both the data source and the data target are connected to the selected agent server, and, under control of the selected agent server, transferring data from the data source to the data target without using one of the other agent servers, wherein the data source and the data target are both connected to the selected agent server.

8. The apparatus of claim 7 above, wherein under control of an agent server, further comprising:

means for receiving the query from the manager server;

means for executing the query to obtain status information; and means for transmitting the status information to the manager server.

9. The apparatus of claim 8 above, wherein under control of the manager server, further comprising:

means for receiving the status information; and means for storing the status information in a central storage device.

10. The apparatus of claim 7 above, wherein the manager server is connected to a client that requests the query, and further comprising the means for, under control of the client, accessing the stored status information.

11. The apparatus of claim 7 above, wherein a data analysis computer is connected to the data target, further comprising the means for performing data analysis on the data target from the data analysis computer.

12. The apparatus of claim 7 above, wherein the means for selecting further comprises the means for, under control of the manager server, storing the query for later forwarding to an agent server.

13. An article of manufacture comprising a program storage medium readable by a computer and embodying one or more instructions executable by the computer to perform method steps for executing a query to retrieve data from a database stored on a data storage device, the method comprising the steps of:

under control of a manager server:

selecting one of a plurality of agent servers to execute the query based upon availability of each agent server and based upon connections between each agent server and a data source and a data target required for execution of the query;

limiting each data transfer to data transfers between the data source and the data target, when both the data source and the data target are connected to the selected agent server; and under control of the selected agent server, transferring data from the data source to the data target without using one of the other agent servers, wherein the data source and the data target are both connected to the selected agent server.

14. The article of manufacture of claim 13 above, further comprising, under control of the agent server, the steps of:

receiving the query from the manager server;

executing the query to obtain status information; and transmitting the status information to the manager server.

15. The article of manufacture of claim 14 above, further comprising, under control of the manager server, the steps of:

receiving the status information; and storing the status information at a central storage device.

16. The article of manufacture of claim 13 above, wherein the manager server is connected to a client that requests the query, and further comprising the step of, under control of the client, accessing the stored status information.

17. The article of manufacture of claim 13 above, wherein a data analysis computer is connected to the data target, further comprising the step of performing data analysis on the data target from the data analysis computer.

18. The article of manufacture of claim 13 above, wherein after the step of selecting, the manager server stores the query for later forwarding to an agent server.

* * * * *